United States Patent [19]
Green

[11] 4,162,972
[45] Jul. 31, 1979

[54] ENCLOSED FLOTATION DEVICE

[76] Inventor: Gerald G. Green, 6868 Los Verdes Dr., Palos Verdes, Calif. 90274

[21] Appl. No.: 936,640

[22] Filed: Aug. 24, 1978

Related U.S. Application Data

[63] Continuation of Ser. No. 792,099, Apr. 29, 1977, abandoned.

[51] Int. Cl.² ............................ B03D 1/24; B01F 3/04
[52] U.S. Cl. ...................................... 210/44; 210/74;
210/195.1; 210/221 P; 209/170; 261/30;
261/36 R; 261/124; 261/DIG. 75; 426/489;
127/12; 127/57
[58] Field of Search ................ 210/13, 44, 3, 60, 61,
210/74, 195 R, 220, 73 R, 221 R, 221 P; 209/5,
162, 164, 165, 166, 168, 170; 261/30, 36 R, 124,
DIG. 75; 127/12, 27, 57; 426/489, 490, 495

[56] References Cited

U.S. PATENT DOCUMENTS

| | | | |
|---|---|---|---|
| 1,138,202 | 5/1915 | Erlwein | 127/12 |
| 1,242,445 | 10/1917 | Ittner | 127/12 |
| 1,598,858 | 9/1926 | Greenawalt | 261/124 |
| 1,808,956 | 6/1931 | Ketterer | 261/DIG. 75 |
| 2,151,547 | 3/1939 | Auerbach | 261/DIG. 75 |
| 2,246,734 | 6/1941 | Kleijn | 261/124 |
| 3,301,779 | 1/1967 | Kovacs | 210/44 |
| 3,642,618 | 2/1972 | Silva | 210/44 |
| 3,722,679 | 3/1973 | Logue | 261/DIG. 75 |
| 3,741,770 | 6/1973 | Van Olphen | 426/15 |
| 3,799,511 | 3/1974 | Svantesson | 261/124 |
| 3,886,068 | 5/1975 | Eron | 210/44 |
| 3,953,326 | 4/1976 | Reimann | 210/220 |
| 3,959,131 | 5/1976 | Ramirez | 210/44 |
| 3,986,954 | 10/1976 | George | 210/44 |

FOREIGN PATENT DOCUMENTS 236892 11/1964 Austria ........................... 261/DIG. 75

OTHER PUBLICATIONS

"Wemco Hydrocleaner Flotation Machine", Enirotech, 1976.

Primary Examiner—Charles N. Hart
Assistant Examiner—Ernest G. Therkorn
Attorney, Agent, or Firm—Donald D. Mon

[57] ABSTRACT

A process for clarifying by flocculation a turbid liquid which forms a foam with injected gas and which contains material that, with gas, will form a floatable floc. A gas compatible with the liquid is injected into the liquid in order to form foam atop the body of liquid, and components of a floc within the body of liquid. The liquid after said treatment with gas is permitted to reside quietly so that the floc components form a floatable floc and rise to the surface of the body of liquid. Clarified liquid collects below the floc. Gas for injection into the body of liquid can be withdrawn from a region containing the foam, whereby to recover liquid from the foam, thereby substantially eliminating loss of liquid as foam.

16 Claims, 10 Drawing Figures

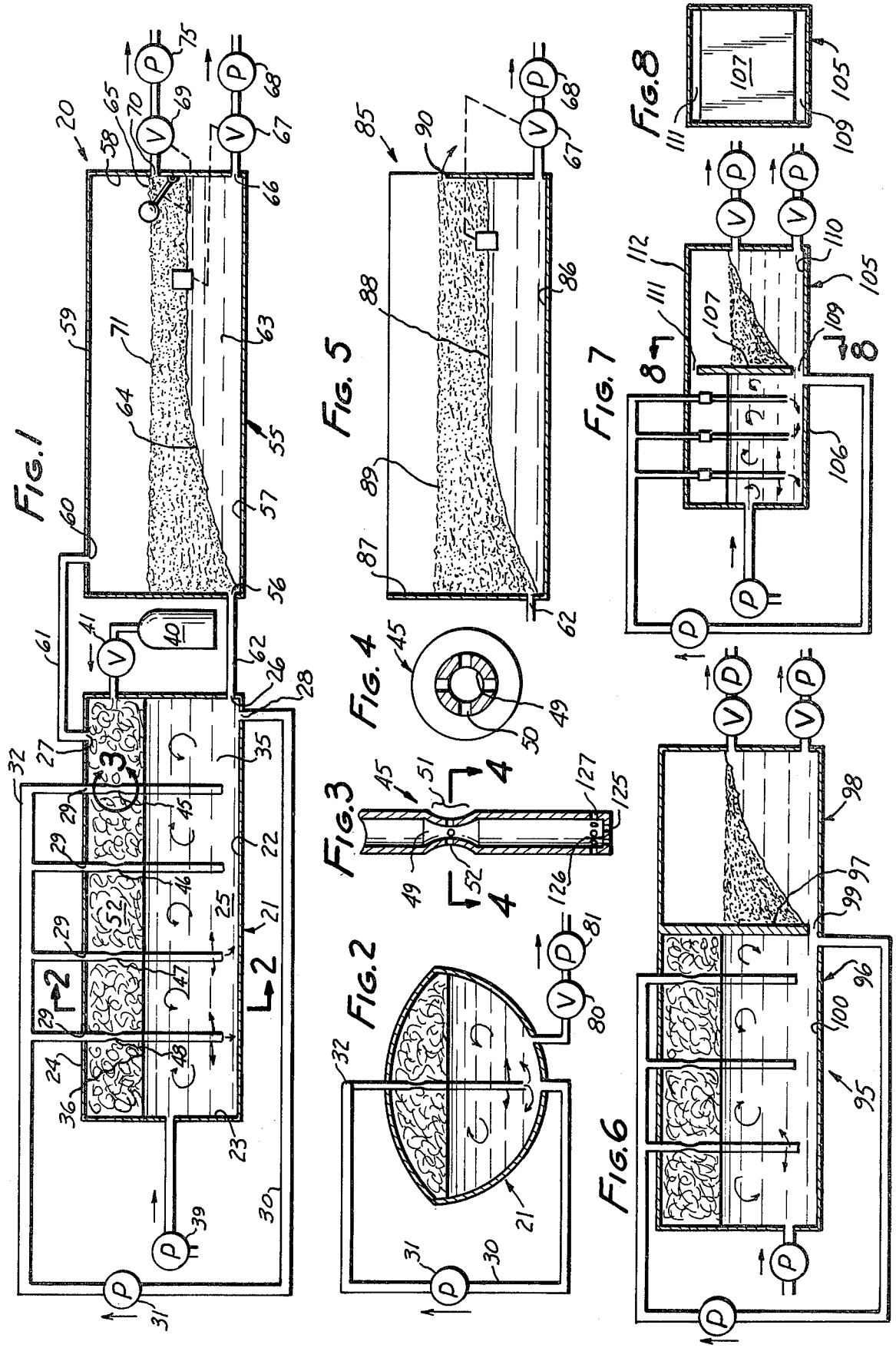

ENCLOSED FLOTATION DEVICE

This is a continuation of application Ser. No. 792,099, filed Apr. 29, 1977, now abandoned.

This application relates to a process for clarifying a liquid by flocculation. An example is fruit juice containing particulate matter such as pieces of skin and stems.

The clarification of liquids by flocculation is known. It is a known practice to inject gas into liquids for attaching minute air bubbles to the particulate matter which in turn will form a floc that collects on the surface. Examples of such processes are shown in Bailey U.S. Pat. No. 3,647,069, Van Olphen U.S. Pat. No. 3,741,770 and George U.S. Pat. No. 3,986,954.

The prior art involves several serious problems such as formation and loss of foam, which seriously reduces the recovery of product and requires complicated and costly process equipment such as filters or centrifuges.

It is an object of this invention to provide means for clarifying liquids which can operate on a continuous or on a batch basis, utilizing simple process equipment and which produces an optimally clarified product with maximized net recovery of product.

A process according to this invention includes the steps of injecting into a body of a turbid liquid to be clarified a gas which is compatible with the liquid whereby to form a foam which rises to the top of the body of liquid, and also to form components of a floc with particulate material. Substantially all of the foam is retained in the vessel. Gas which escapes the body is continuously reinjected into the body of liquid together with at least some of the foam. After said injection, the liquid is permitted to reside quietly, whereby to permit a floc to form atop the surface of the liquid, from which it is removed. The clarified liquid is removed from beneath the floc.

According to a preferred but optional feature of the invention, the gas injection is accomplished under turbulent conditions.

The presently preferred embodiment of apparatus for accomplishing the foregoing comprises a recirculating liquid system with a gas injector having an aspirating inlet which is disposed in the region where the foam is collected, whereby to recirculate both the gas and the foam.

The above and other features of this invention will be fully understood from the following detailed description and the accompanying drawings, in which:

FIG. 1 is a side elevation partly in schematic notation showing the presently preferred embodiment of the invention;

FIG. 2 is a cross-section taken at line 2—2 of FIG. 1;

FIG. 3 is a fragmentary axial cross-section taken at region 3 in FIG. 1;

FIG. 4 is a cross-section taken at line 4—4 of FIG. 3;

FIG. 5 is a side elevation partly in cutaway cross-section showing an alternate embodiment of a portion of FIG. 1;

FIGS. 6 and 7 are side elevations partly in cutaway cross-section showing other embodiments of the invention;

FIG. 8 is a cross-section taken at line 8—8 of FIG. 7; and

Figure 9:
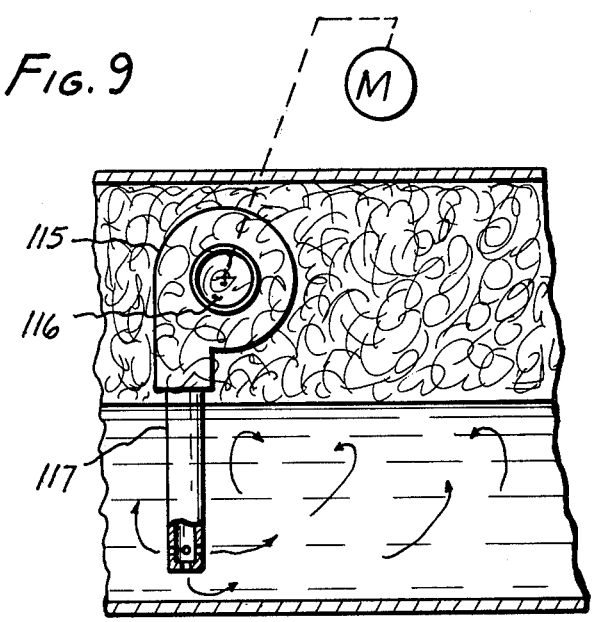
FIGS. 9 and 10 are fragmentary cross-sections showing other embodiments of portions of the invention.

FIG. 1 shows the presently preferred apparatus 20 according to the invention which is also the best known mode. It includes an injection vessel 21 having a bottom 22, a fully peripheral sidewall 23, and a closed top 24 whereby to enclose an injection region 25. The vessel has an outlet 26 and a counterbalance port 27. It also has a recirculation outlet port 28 and a plurality of recirculation inlet ports 29 all of which are identical to one another. A recirculation conduit 30 receives liquid from port 28 which is pumped through conduit 30 by recirculation pump 31 to a manifold 32 that discharges to inlet ports 29.

A body 35 of liquid to be clarified has its surface 36 maintained at an intermediate elevation in the injection region. A pump 39 supplies liquid to be clarified from a source thereof to valve 37. The pump supplies liquid at a rate established by the outflow from the system.

A gas supply means 40 such as a cylinder supplies gas for use in the clarification process. The gas used should be compatible with the liquid to be clarified, that is, it should not deleteriously react with it. Often it will be an inert gas such as nitrogen or carbon dioxide. Air can be used for many liquids, such as fruit juices. A gas supply valve 41, which can be a pressure-balanced reducer-regulator valve releases the necessary gas from a cylinder.

Injectors 45, 46, 47, 48 ("injector means") are connected to respective ones of inlet ports 29. The injector means are all identical so that only injector 45 is shown in detail in FIGS. 3 and 4. It includes a conventional venturi throat 49 having aspirator ports 50 entering its constricted region 51. The aspirator ports receive gas and foam from a foam-collecting region 52 in the injector vessel above surface 36.

The term "foam" as used herein means gas filled bubbles of the liquid. The liquid in the foam can, of course, include particulate material and components of floc. Therefore the term "foam" does not exclude particulate material and components of floc from its composition.

A flocculation vessel 55 has an inlet port 56 near its bottom. This inlet port is connected by transfer conduit 62 to outlet 26 from the injection vessel. This flocculation vessel has a bottom 57, a fully peripheral sidewall 58, and a closed top 59. A counterbalance port 60 is connected by a counterbalance conduit 61 to counterbalance port 27 of the injection vessel.

FIG. 1 schematically illustrates the formation of floc in the flocculation vessel. This vessel is "quiet" in the sense that its contents are not maintained turbulent. The principal movements are the agglomeration of the components of floc that were formed in the injection vessel and their rise to the top of the body of liquid, and horizontal movement of the liquid toward the outlet port 66 from the vessel.

The liquid enters the flocculation vessel as a mixture of liquid and components of floc, plus perhaps some agglomerated floc which was not broken up by turbulence in the injection vessel. Then, in the quiet flocculation vessel, formation of the floc and its separation from the liquid begins. The floc is itself quite wet and even somewhat soupy. However, there is an observable interface 64 at the surface of rather well-clarified liquid 63 above which the floc 65 predominates. Preparation of this clarified liquid is the objective of this invention. FIG. 1 shows that the interface rises from the inlet to the outlet, because the thickness of the layer of the settled clarified liquid increases from inlet to outlet. Also, the floc becomes drier from inlet end to outlet end. The upper level of the floc tends to be horizontal because it is wet enough to seek its own level 71. This level 71 tends to approximate the same level as the liquid in the injection tank. The flow through the system is determined by the rate at which liquid is drawn from the flocculation vessel. An outlet port 66 beneath surface 64 includes an outlet valve 67. A pump 68 draws clarified liquid out of the tank at a rate determined by its own speed and limited by valve 67. Valve 67 is responsive to a sensor which stops withdrawal of liquid if the interface is below a predetermined level, and permits it if above. It tends to maintain the interface elevation. A floc outlet port 70 is disposed near the surface within the region where the floc is intended to be formed. A valve 69 and a suction pump 75 are provided to remove the floc from the surface through this port. A control 74 responsive to floc level limits the pumping action to times when port 70 is flooded so it cannot pump gas out of the system.

FIG. 2 is a cross-section of FIG. 1. However, it includes a schematic showing of a valve and pump arrangement which can enable the entire process to be carried out in a single vessel, on a batch basis rather than on a steady flow basis. In such an arrangement, an outlet valve 80 and a pump 81 are provided near the bottom of the vessel for purposes which will hereafter be disclosed.

FIG. 5 shows an alternative flocculation vessel 85 with a bottom 86, and a fully peripheral sidewall 87, but without a top. This is an open top vessel which contains liquid with a surface 88 where floc 89 collects, as in FIG. 1. A weir 90 is formed in the sidewall, and the floc flows over the weir and out of the system. In this embodiment the injection vessel is not connected to the flocculation vessel by a counterbalance conduit. Instead the upper region of the injection vessel is closed.

FIG. 6 shows that the injection vessel and the flocculation vessel need not be entirely separate structures. Instead a single larger vessel 95 includes an injection vessel 96 as a portion to the left of a baffle 97 in FIG. 6, and a flocculation vessel 98 to the right of the baffle. A transfer conduit 99 is formed by the gap beneath the bottom edge of baffle 97 and the bottom 100 of vessel 95. In all other details, the construction of the system of FIG. 6 can be the same as those of FIG. 1.

FIGS. 6 and 7 also show that a level control is not necessary for the flocculation vessel. For that matter, it can even be dispensed with in the injection vessel by proper settings of the valves for steady flow, or by operating the device in a batch mode. However, they may be provided with the same controls as are provided in FIG. 1.

FIG. 7 shows a vessel 105 which includes an injection vessel 106 to the left of the baffle 107, with a flocculation vessel 108 to the right of it. A transfer conduit 109 is formed below the bottom edge of the baffle and the bottom 110 of the vessel. A counterbalance conduit 111 is formed by a gap between the upper edge of the baffle and the top 112 of the vessel.

Figure 10:
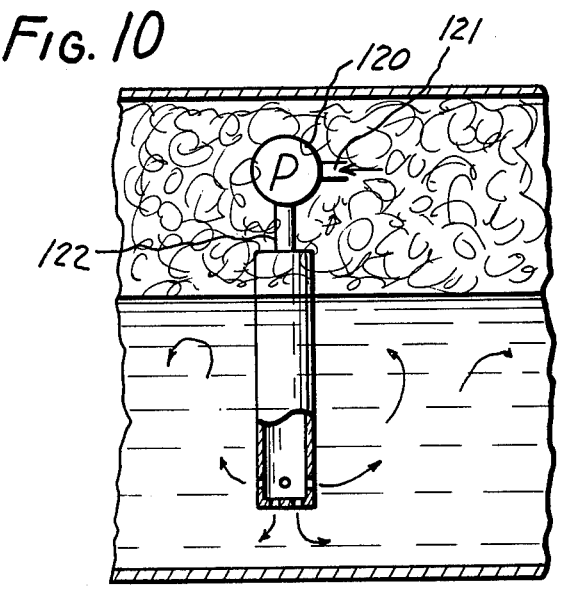

FIGS. 9 and 10 show two alternate constructions for the injector means. In FIG. 9 the injector means is a squirrel cage blower 115 having its inlet in the foam collecting region 52 and its outlet 116 beneath the surface of the liquid. In FIG. 10, the injector means is a pump 120 of a type which is able to pump both gas and foam. Its inlet 121 is in the foam collecting region, and its outlet 122 is beneath the surface of the liquid.

Optimum formation of floc components will occur in a turbulent liquid, because then there is increased contact between gas bubbles and particulate material. However, slowly rising bubbles from bubble plates will still form floc components. Therefore turbulence is only a preferred, not a required feature.

Turbulence can be caused by propellers, impellers, stirrers, or reciprocating pumps, instead of, or in addition to, the means shown in the drawings. In the drawings, good gas-liquid contact is made in the venturi throat. Turbulence is caused by the flow of liquid from the injectors into the lower region of the injector vessel. A straight pipe with an open end can be used. Even better is the structure shown in FIG. 3, where the bottom end 125 of the injector is a perforated plate, and perforations 127 are formed in the wall of the injector tube. The resulting jets of liquid/gas into the vessel will create turbulence.

FIGS. 1–7 show that the gas can be reinjected as part of a recirculating liquid, while FIGS. 9 and 10 show that gas or gas-foam mixture can be recycled without recycling the liquid.

The operation of the system of FIG. 1 in a continuous flow mode is as follows. Once the system has been placed in steady flow operation, clarified liquid can be withdrawn through outlet valve 67 at an appropriate rate determined by the illustrated controls or by appropriate valve settings. Liquid to be clarified is supplied to the injection vessel to maintain the proper level. Recirculation pump 31 pumps liquid from the injection vessel to manifold 32, and thence into the injector means. The injector means of FIG. 1 aspirates gas and foam from the foam collecting region 52 and reinjects it into the liquid below surface 64. Particulate matter and gas bubbles form components of floc in accordance with known principles. Turbulence increases the rate of formation of these components. Makeup gas is supplied as necessary.

It will be noted that substantially all of the foam is retained in the foam collecting region. In prior art devices, it is possible for the foam to escape. Because foam is a mixture of gas and of the liquid being clarified, it is even possible to foam away all of the product. This is inherently impossible in this system where the foam itself is steadily destroyed by being recirculated along with the gas.

This system is intended for use with materials which will foam. Sugar-containing liquids such as fruit juices (grape juice, for example) foam so badly that it is not uncommon for anti-foam materials to be added to them at a considerable cost. This invention can dispense with these substances. When non-foaming substances such as water are to be treated, a foaming agent can be added.

Liquid is gradually removed from the injection vessel and moved into the flocculation vessel, where the liquid resides quietly enough to permit the floc to form and rise. The floc is formed from particles of material to which tiny gas bubbles have attached. There appears to be an electrochemical reaction of some sort which causes an agglomeration of these particles once they are formed and reside when in a quiet enough region that they can gather together in clumps. The formation of these particles with suitable gas is best performed in a turbulent environment. The flocculation is best done in a quiet environment. This process thereby provides the two best possible conditions for the process.

In the flocculation vessel the floc is skimmed or pumped off, and the clarified liquid is pumped from beneath it.

FIG. 2 shows that the process need not be conducted in a steady flow mode. Instead it shows that the flocculation vessel can be eliminated or disconnected, and the gas injection first conducted just as in FIG. 1. However, after a turbulent injection period, the recirculation pump may be turned off and the contents of the tank permitted to rest quietly while the floc rises to the surface. Thereafter, valve 80 can be opened and the pump will first pump off clarified liquid and thereafter the floc. Then the tank may be refilled and the batch process repeated.

FIG. 5 shows that the floc may be removed by flow over a weir rather than by pumping.

FIG. 6 shows that the two vessels, namely the injection and the flocculation vessels can be integral with one another and connected by a short gap rather than by a conduit. This shows that there merely need be separate injection and quiet flocculation zones, just as FIG. 2 shows that the injection and flocculation may be separated in time. This term "flocculation" as used herein means the gathering of the floc components into a floating floc.

FIGS. 7 and 8 show the use of an integral tank for providing the two types of vessels with integral transfer and counterbalancing conduitry.

FIG. 9 shows that it is unnecessary to utilize the liquid itself as a means for injecting liquid but that instead the foam and gas may be injected without recirculation of liquid. In FIG. 9 a squirrel cage type blower does this, and in FIG. 10 a conventional pump does it. However in all embodiments, the foam collection is limited and the foam is injected along with the gas.

The arrangement of FIG. 1 is to be preferred, because there is a mixing of gas with liquid in the aspirator as well as when the gas-liquid mixture is ejected from the injector into the liquid.

A typical operation of this process is as follows:

Grape juice, freshly crushed, about 5% to 20% solids by volume.

Solids discharged as floc: about 30% to 70% solids by volume.

Clarified juice, about 1% to 2% solids by volume.

Retention time in turbulent gas injection conditions, about 5 to 10 minutes.

Retention time in quiescent condition, about 5 to 10 minutes.

Recirculation rate selected to suit turbidity.

Flow capacity is defined by the physical system.

This invention thereby provides an elegantly simple means for clarifying a foamable liquid. It does so by optimally injecting gas into an injection region, and then providing a quiet region for floc formation and separation. Experiments have shown that grape juice can be clarified to an acceptable clarity without tolerating the clogging of filters, expensiveness of centrifuges, and many complications and losses of the prior art.

This invention is not to be limited by the embodiments shown in the drawings and described in the description which are given by way of example and not of limitation but only in accordance with the scope of the appended claims.

I claim:

1. A process for clarifying by flocculation a turbid liquid which forms a foam with injected gas, and which contains material which, with gas, will form a floatable floc, said process comprising: in an injection vessel, on a continuous basis injecting into a body of said liquid a gas compatible with said liquid, whereby to form a foam atop the body of liquid and to form components of floc within said body of liquid; retaining said foam in said injection vessel in such manner as to prevent its escape; continuously and for a substantial period of time reinjecting into said body of liquid such of said gas which escapes said body of liquid and at least some of said foam, whereby substantially to eliminate loss of liquid in the form of foam; thereafter on a continuous basis transferring liquid from said body of liquid to a closed flocculation vessel wherein said liquid is quietly contained, whereby to form a three phase system comprising liquid at the bottom, high solid floc atop the liquid and froth-gas atop the floc, and on a continuous basis withdrawing liquid and floc from levels where their respective phase exists.

2. A process according to claim 1 in which the liquid is maintained turbulent while the gas is being injected into it.

3. A process according to claim 1 in which the gas and the foam are simultaneously reinjected into the body of liquid in the injection vessel by an injector means.

4. A process according to claim 3 in which, during gas injection, liquid is recirculated through injector means, said injector means having an aspirator port disposed where the foam is retained, whereby to entrain said foam and said gas in recirculated liquid.

5. A process according to claim 4 in which said injector means is an aspirator.

6. A process according to claim 3 in which the injector means is a pump.

7. A process according to claim 3 in which the injector means is a blower.

8. A process according to claim 1 in which the level where the said froth-gas phase exists in the flocculation vessel is connected to the region in the injection vessel overlaying said body of liquid to enable return of gas and froth from the flocculation vessel to the injector vessel.

9. Apparatus for clarifying a liquid capable of forming a foam with a gas, and having a substance to be removed which forms a floatable flock with said gas, said apparatus comprising: an injection vessel having a bottom, sidewall, and closed top to form a lower injection region and an overlaying foam-retention region for receiving and preventing the escape of foam therefrom; injector means for injecting gas and foam from said foam-retention region into a body of liquid contained in said injection region; means for supplying liquid to be clarified to said injection vessel a flocculation vessel having a bottom, closed top, and sidewall; said liquid in said flocculation vessel after residing quietly therein forming three phases at three levels: liquid, high solid floc, and froth-gas; a transfer conduit connecting said flocculation vessel to a level in said injection vessel below the surface of said body of liquid for transferring liquid from the injection vessel to the flocculation vessel; counterbalance passage means interconnecting the froth-gas level to said overlaying region; means at the floc level for removing floc from the flocculation vessel; and means at the liquid level for removing liquid from the flocculation vessel.

10. Apparatus according to claim 9 in which the sidewalls of said two tanks are individually fully peripheral.

11. Apparatus according to claim 9 in which the two tanks share a common sidewall, said two tanks being formed separately by a baffle extending across the volume defined by the sidewall.

12. Apparatus according to claim 11 in which the transfer conduit and the counter-balance conduit are formed as openings between the baffle and the bottom and top of the tank, respectively.

13. Apparatus according to claim 9 in which the injector means comprises an aspirator.

14. Apparatus according to claim 13 in which a recirculating conduit recirculates liquid from beneath said surface to the aspirator thereby to operate as aspiration means to draw the foam and gas in the injection vessel into said injection means and to discharge the same into a body of liquid beneath the said intended surface.

15. Apparatus according to claim 9 in which the injector means comprises a blower having an inlet above said intended surface and an outlet below said intended surface.

16. Apparatus according to claim 9 in which the injector means comprises a pump having an inlet above said intended surface and an outlet below said intended surface.

* * * * *